(12) United States Patent
Mou et al.

(10) Patent No.: US 10,698,451 B2
(45) Date of Patent: Jun. 30, 2020

(54) PORTABLE ELECTRONIC DEVICE WITH ACTUATING AND SENSING MODULE

(71) Applicant: Microjet Technology Co., Ltd., Hsinchu (TW)

(72) Inventors: Hao-Jan Mou, Hsinchu (TW);
Shih-Chang Chen, Hsinchu (TW);
Jia-Yu Liao, Hsinchu (TW);
Shou-Hung Chen, Hsinchu (TW);
Yung-Lung Han, Hsinchu (TW);
Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 205 days.

(21) Appl. No.: 16/036,027

(22) Filed: Jul. 16, 2018

(65) Prior Publication Data
US 2019/0056766 A1 Feb. 21, 2019

(30) Foreign Application Priority Data
Aug. 21, 2017 (TW) .............................. 106128265 A

(51) Int. Cl.
*G01N 1/22* (2006.01)
*F04B 43/04* (2006.01)
(Continued)

(52) U.S. Cl.
CPC ............ *G06F 1/1656* (2013.01); *F04B 35/04* (2013.01); *F04B 45/047* (2013.01);
(Continued)

(58) Field of Classification Search
CPC .. F04B 35/04; F04B 43/00–04; F04B 45/047; G01N 1/22–26; G06F 1/1601;
(Continued)

(56) References Cited

U.S. PATENT DOCUMENTS 6,165,347 A 12/2000 Warburton
2013/0276517 A1* 10/2013 Takano ................... G01M 3/16
73/40.5 R
(Continued)

FOREIGN PATENT DOCUMENTS

EP 2187653 A1 5/2010
EP 2998582 A1 3/2016
(Continued)

OTHER PUBLICATIONS

Extended European Search Report, dated Jan. 15, 2019, for European Application No. 18183711.3.
Cheng et al., "Design and fabrication of piezoelectric actuated valve micropump and its application in electronic cooling", Taiwan AOI Forum & Show, 2012, <http://aoiea.itri.org.tw/files/columnist/201305031805260243​10/file/1/B09-2.pdf>, total 14 pages.

*Primary Examiner* — Nguyen Q. Ha
(74) *Attorney, Agent, or Firm* — Birch, Stewart, Kolasch & Birch, LLP

(57) ABSTRACT

A portable electronic device includes a casing and an actuating and sensing module. The casing includes at least one inlet aperture, at least one vent aperture, a first chamber, a second chamber and at least one communication channel. The communication channel is connected between the first chamber and the second chamber. The actuating and sensing module includes an actuating device and a sensor. The actuating device is disposed within the first chamber and closes the inlet aperture. The actuating device further includes a first protective film. The sensor is disposed within the second chamber. When the actuating device is enabled, a gas is guided into the first chamber through the inlet aperture, and the gas is transferred to the second chamber through the communication channel so as to be monitored by the sensor. After the gas is monitored, the gas is outputted from the vent aperture.

17 Claims, 10 Drawing Sheets

(51) Int. Cl.
   *G06F 1/16* (2006.01)
   *F04B 35/04* (2006.01)
   *F04B 45/047* (2006.01)
   *G08B 21/12* (2006.01)
   *G06F 1/26* (2006.01)
   *G06F 3/048* (2013.01)

(52) U.S. Cl.
   CPC .......... *G06F 1/1601* (2013.01); *G06F 1/1626* (2013.01); *G06F 1/26* (2013.01); *G06F 3/048* (2013.01); *G08B 21/12* (2013.01)

(58) Field of Classification Search
   CPC ........ G06F 1/1626; G06F 1/1656; G06F 1/26; G06F 3/048; G08B 21/12
   See application file for complete search history.

(56) References Cited

U.S. PATENT DOCUMENTS

2016/0171869 A1    6/2016  Gullbrand et al.
2019/0250135 A1*   8/2019  Andersson ........... B01D 53/228

FOREIGN PATENT DOCUMENTS

| | | | | |
|---|---|---|---|---|
| JP | 2005307858 A | * | 11/2005 | .............. F04B 43/04 |
| JP | 2009097393 A | * | 5/2009 | .............. F04B 43/02 |
| JP | 2014-35728 A | | 2/2014 | |
| TW | M525446 U | | 7/2016 | |
| TW | M544653 U | | 7/2017 | |

* cited by examiner

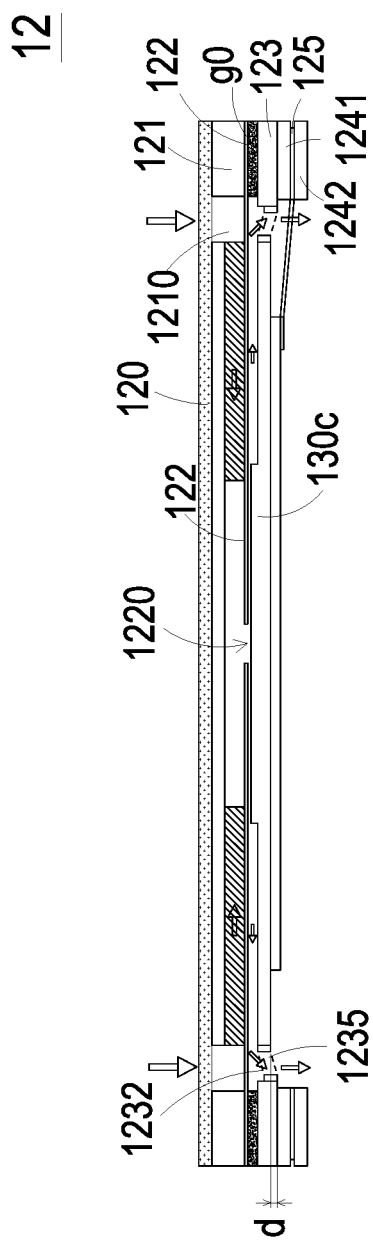
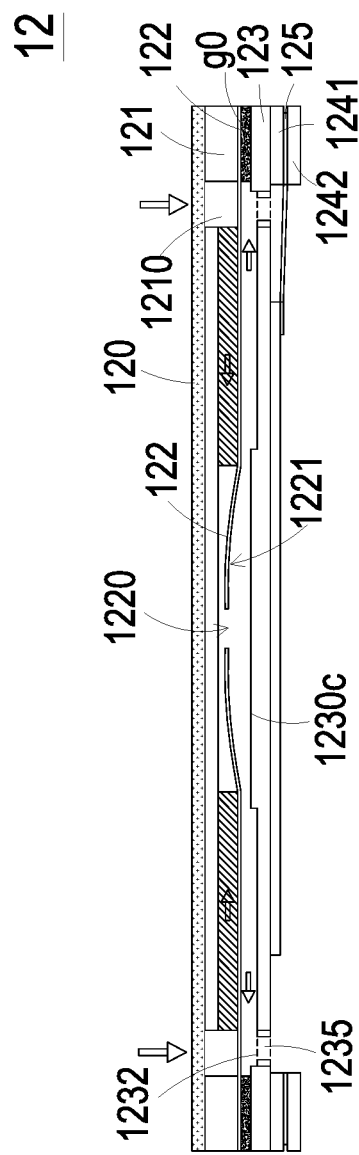
FIG. 5D
FIG. 5E

PORTABLE ELECTRONIC DEVICE WITH ACTUATING AND SENSING MODULE

FIELD OF THE INVENTION

The present disclosure relates to a portable electronic device, and more particularly to a miniature, silent, waterproof and dustproof portable electronic device with an actuating and sensing module.

BACKGROUND OF THE INVENTION

Nowadays, people pay much attention to the air quality in the environment. For example, it has become common to monitor air pollutants in the environment, such as carbon monoxide, carbon dioxide, volatile organic compounds (VOC) and PM2.5, while the exposure of these substances can cause human health problems or even can be life-threatening. Therefore, environmental air monitoring has been taken seriously by most countries.

However, the conventional environmental gas detector (e.g., the air cleaner with air quality detection function) is bulky in volume and not easily carried. As a result, it is difficult for the user to acquire the information accurately corresponding to the ambient gas. In other words, the user is highly possible to be exposed to the toxic environment. Therefore, it is important to solve the problem that the user is unable to acquire the information relating to the ambient gas in everywhere and at any time.

Besides, the conventional environmental gas detector generally has no waterproof and dustproof function. Under this circumstance, if there is moisture or liquid entered the environmental gas detector during gas circulation, the gas flow would contain moisture and make the electronic component (e.g., gas sensor) damped, rusted or even damaged. Moreover, if there is dust or particles entered the environmental gas detector, the electronic components could be damaged and the gas transportation efficiency could be reduced. Therefore, it is also important to achieve the waterproof and dustproof efficacy of the environmental gas detector.

For solving the above drawbacks, it is important to provide a miniature, silent, waterproof and dustproof portable electronic device with an actuating and sensing module.

SUMMARY OF THE INVENTION

An object of the present disclosure provides a portable electronic device with an actuating and sensing module. When a piezoelectric actuator of the actuating and sensing module is activated, a pressure gradient is generated in the fluid channel to facilitate the gas to flow at a high speed. Moreover, since there is an impedance difference between the feeding direction and the discharging direction of the fluid channel, the gas can be transmitted from the inlet side to the outlet side. Consequently, the problem existing in the prior art that the volume of the equipment or machine with gas transportation function is bulky, noisy and not portable, is solved.

Another object of the present disclosure provides a portable electronic device with an actuating and sensing module and having the miniature, silent, waterproof and dustproof efficacy. The portable electronic device is equipped with at least one protective film to filter out the moisture and the dust. Consequently, the problem existing in the prior art that the moisture and the dust enter the inside of the device to ruin the components therein and decrease gas transportation efficiency, is solved.

In accordance with an aspect of the present disclosure, a portable electronic device is provided. The portable electronic device includes a casing and an actuating and sensing module. The casing includes at least one inlet aperture, at least one vent aperture, a first chamber, a second chamber and at least one communication channel. The first chamber is in communication with the exterior of the casing through the at least one inlet aperture. The second chamber is in communication with the exterior of the casing through the at least one vent aperture. The at least one communication channel is connected between the first chamber and the second chamber, such that the first chamber and the second chamber are in fluid communication. The actuating and sensing module includes an actuating device and a sensor. The actuating device is disposed within the first chamber as well as closing the at least one inlet aperture. The actuating device further includes a first protective film that is a waterproof and dustproof film structure allowing gas to pass through. The sensor is disposed within the second chamber. When the actuating device of the actuating and sensing module is enabled, the gas is guided into the first chamber through the at least one inlet aperture, and the gas is transferred to the second chamber through the at least one communication channel so as to be monitored by the sensor. After the gas is monitored, the gas is discharged through the at least one vent aperture.

The above contents of the present disclosure will become more readily apparent to those ordinarily skilled in the art after reviewing the following detailed description and accompanying drawings, in which:

BRIEF DESCRIPTION OF THE DRAWINGS

FIGS. 5A to 5E schematically illustrate the actions of the actuating device of FIG. 3A.

DETAILED DESCRIPTION OF THE PREFERRED EMBODIMENT

Figure 1A:
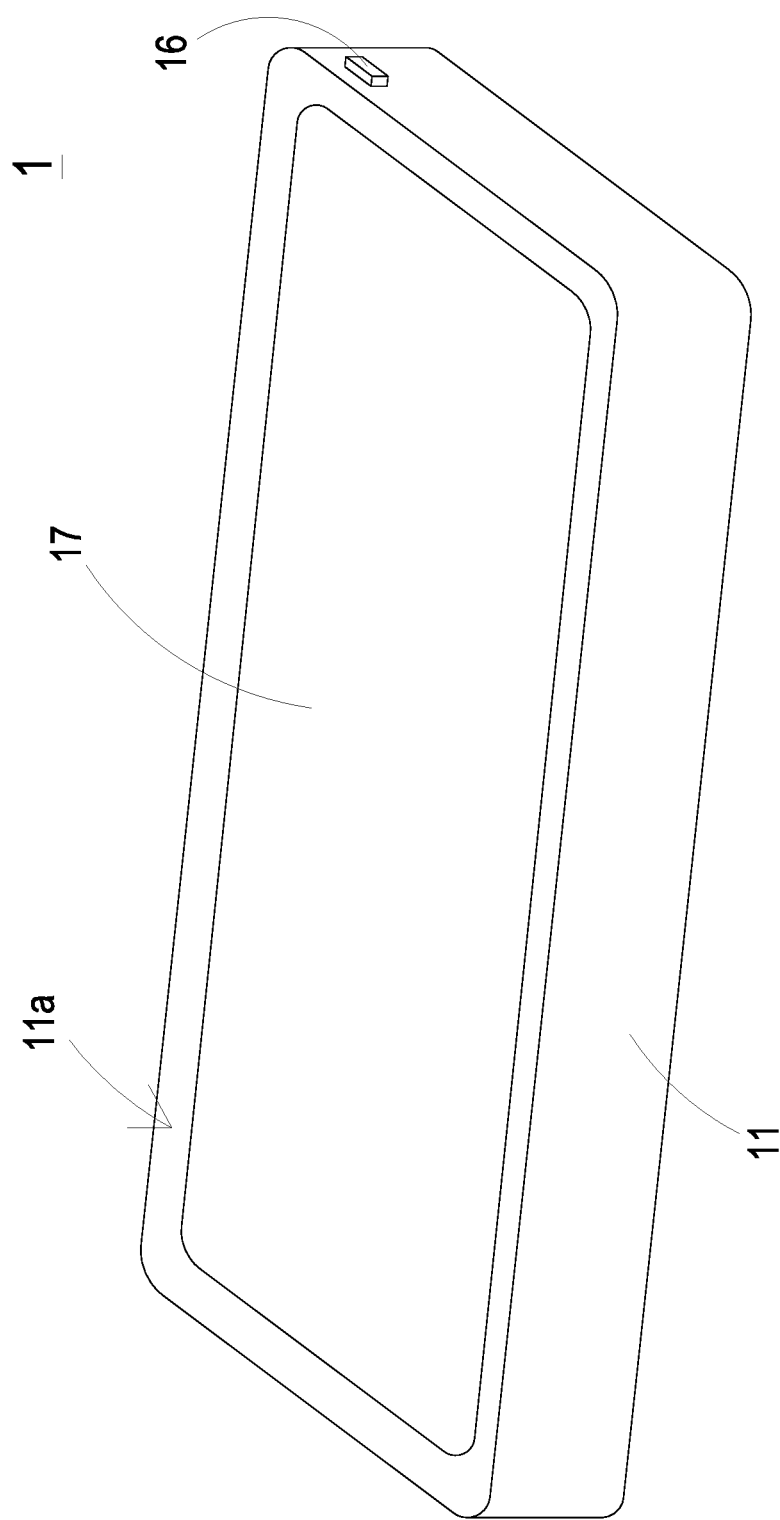
FIG. 1A is a schematic perspective view illustrating the outer appearance of a portable electronic device according to an embodiment of the present disclosure and taken along a front side.

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIGS. 1A to 2B. The present discourse provides a portable electronic device 1 including at least one casing 11, at least one inlet aperture 13, at least one vent aperture 14, at least one first chamber 11c, at least one second chamber 11e, at least one communication channel 11d, at least one actuating and sensing module 10, at least one actuating device 12, at least one sensor 15 and at least one first protective film 120. The number of the casing 11, the first chamber 11c, the second chamber 11e, the actuating and sensing module 10, the actuating device 12, the sensor 15 and the first protective film 120 is exemplified by one for each in the following embodiments but not limited thereto. It is noted that each of the casing 11, the first chamber 11c, the second chamber 11e, the actuating and sensing module 10, the actuating device 12, the sensor 15 and the first protective film 120 can also be provided in plural numbers.

Figure 1B:
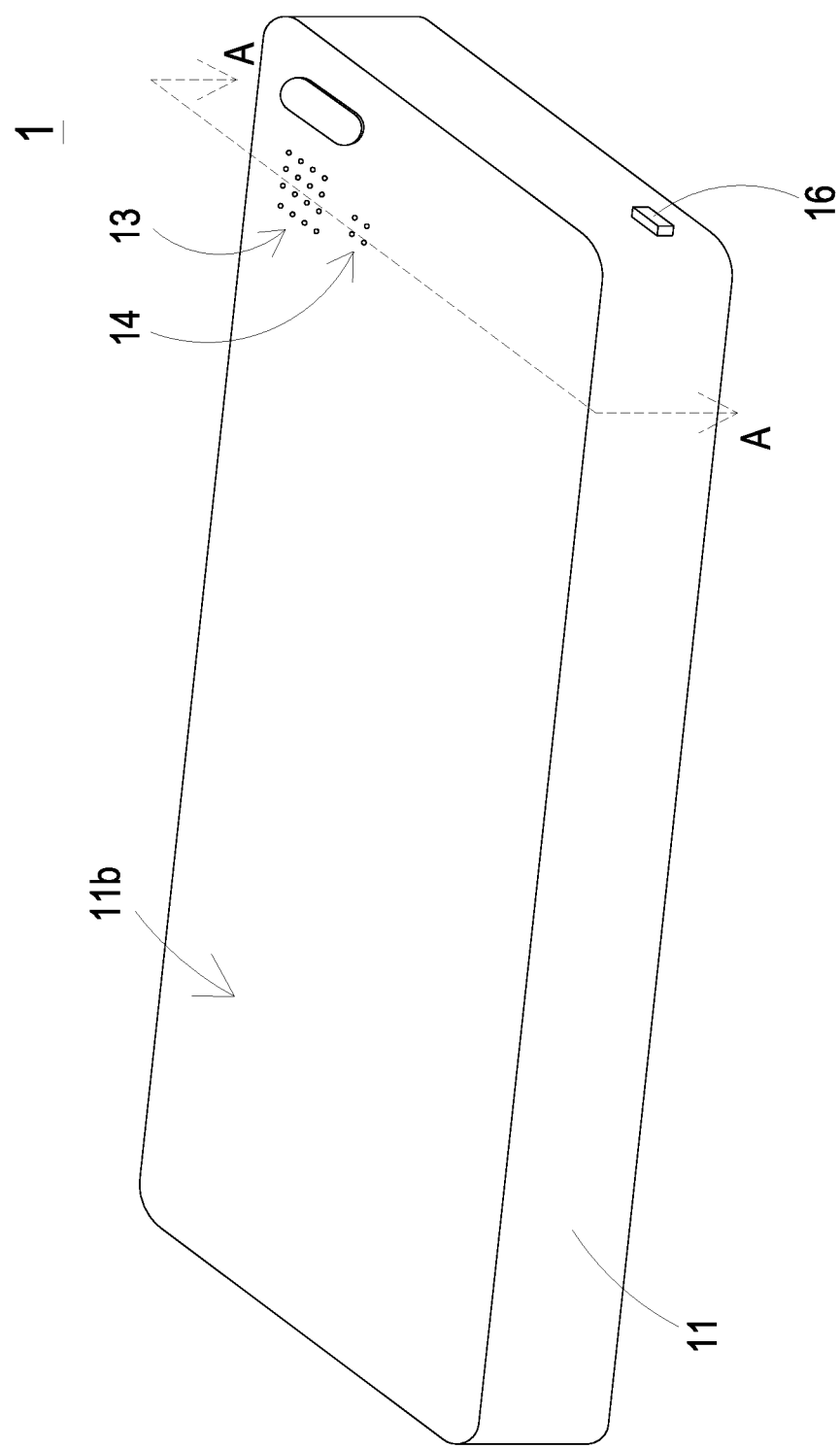
FIG. 1B is a schematic perspective view illustrating the outer appearance of the portable electronic device according to the embodiment of the present disclosure and taken along a rear side.

FIG. 1A is a schematic perspective view illustrating the outer appearance of a portable electronic device according to an embodiment of the present disclosure and taken along a front side. FIG. 1B is a schematic perspective view illustrating the outer appearance of the portable electronic device according to the embodiment of the present disclosure and taken along a rear side. The portable electronic device 1 of the present disclosure is capable of monitoring the quality of the ambient gas while achieving the waterproof, dustproof and silent efficacy. For example, the portable electronic device 1 is a notebook computer, a smart phone, a smart watch, a tablet computer or any other appropriate portable electronic device. In this embodiment, the portable electronic device 1 includes a casing 11 and at least one actuating and sensing module 10. The casing 11 includes at least one inlet aperture 13, at least one vent aperture 14, a power button 16 and a control panel 17. The casing 11 has a first surface 11a and a second surface 11b opposing to the first surface 11a. In this embodiment, there are plural inlet apertures 13 and plural vent apertures 14 formed on the second surface 11b of the casing 11 but not limited thereto, where the casing 11 has sixteen inlet apertures 13 and four vent apertures 14. It is noted that the number of the inlet apertures 13 and the vent apertures 14 may be varied according to the practical requirements. For example, in some other embodiments, the casing 11 has one inlet aperture 13 and one vent aperture 14. The power button 16 is disposed on a sidewall of the casing 11 for being pressed by the user to turn on/off the portable electronic device 1. The control panel 17 is disposed on the first surface 11a of the casing 11. For example, the control panel 17 is a capacitive touch panel. A user operation interface is shown on the control panel 17, through which the user can operate the portable electronic device 1.

Figure 2A:
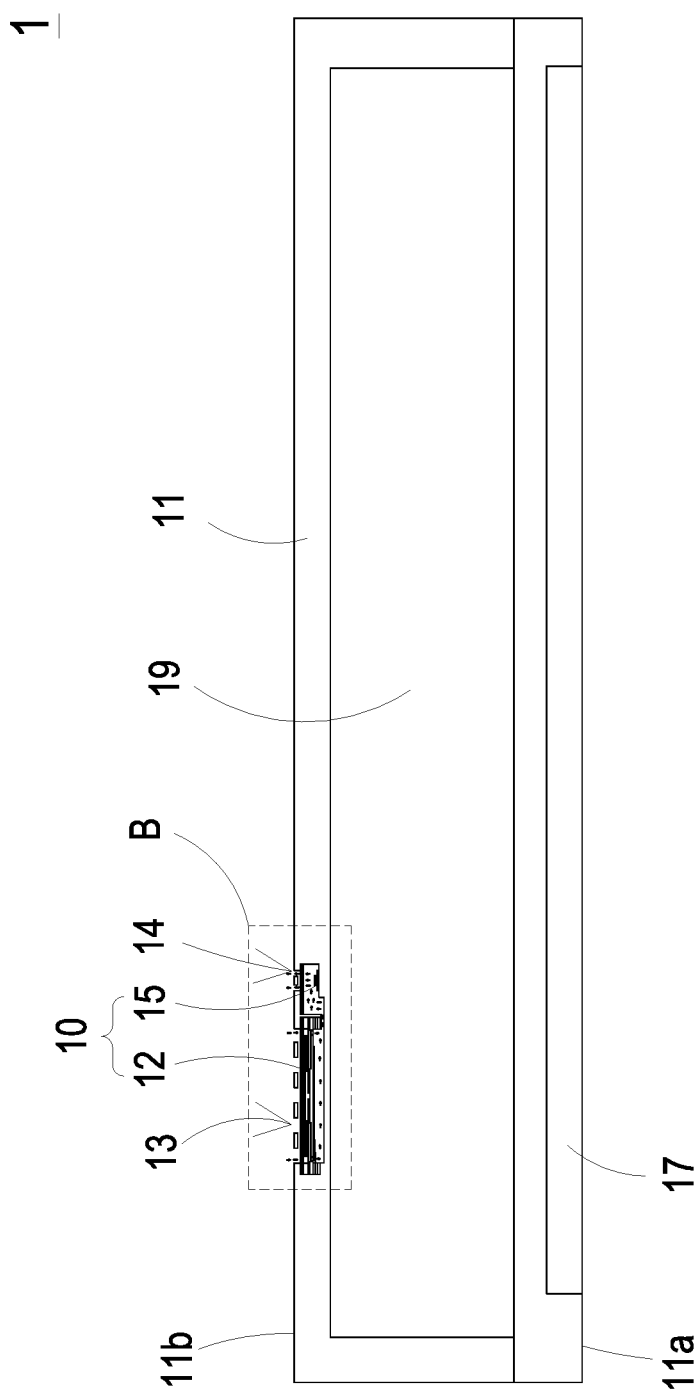
FIG. 2A is a schematic cross-sectional view illustrating the portable electronic device of FIG. 1B and taken along the line AA.
Figure 2B:
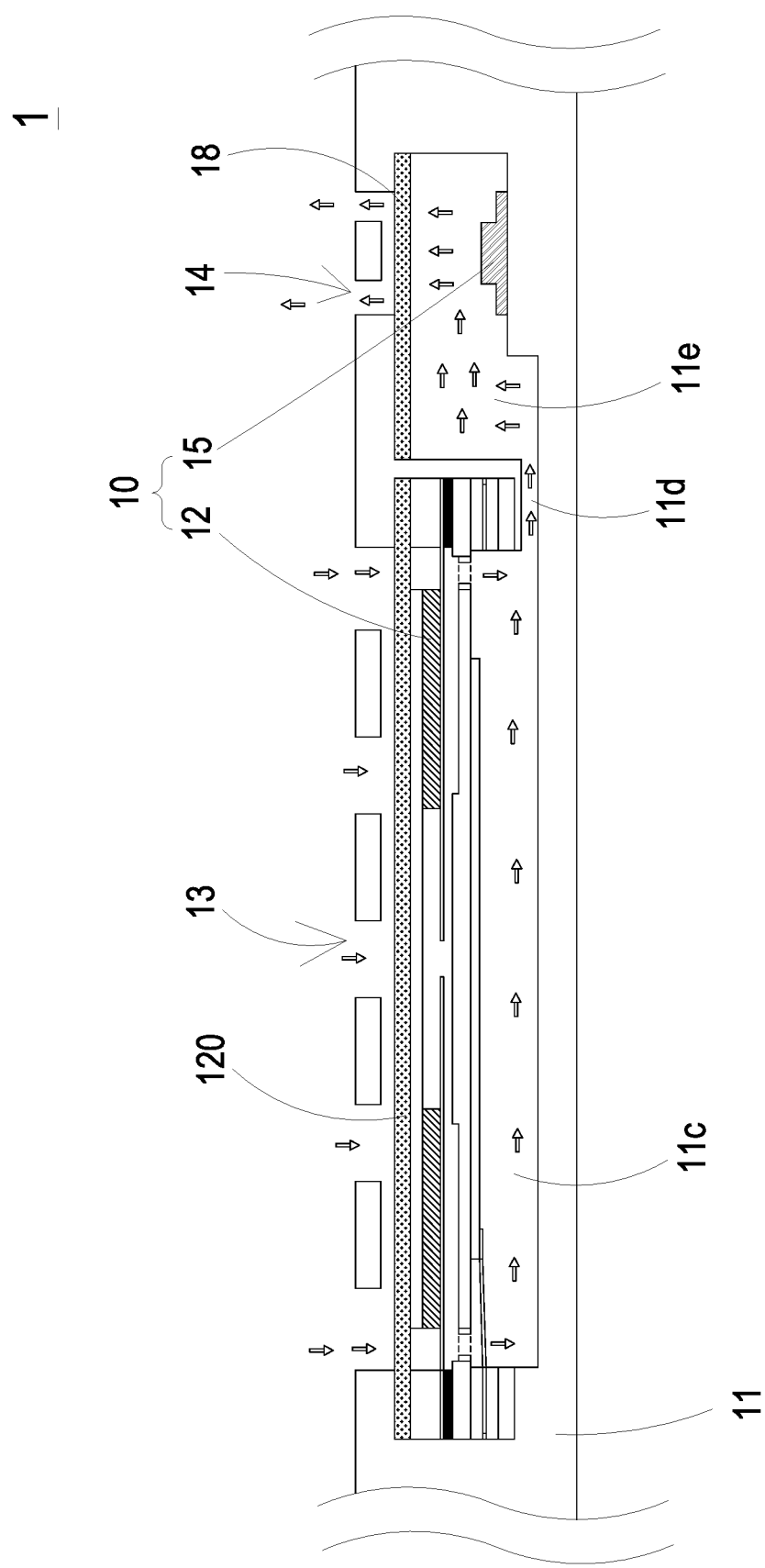
FIG. 2B is a partial enlargement of the portion B in FIG. 2A.

Please refer to FIGS. 1B, 2A and 2B. FIG. 2A is a schematic cross-sectional view illustrating the portable electronic device of FIG. 1B and taken along the line AA. FIG. 2B is a partial enlargement of portion B in FIG. 2A. As shown in FIG. 2A, the casing 11 further includes an accommodation space 19. Some electronic components of the portable electronic device 1 (e.g., a printed circuit board, a battery module, an antenna module, a microprocessor chip, a WIFI and/or a Bluetooth module) may be disposed within the accommodation space 19. As shown in FIG. 2B, the casing 11 further includes a first chamber 11c, a communication channel 11d and a second chamber 11e. The first chamber 11c is in communication with the exterior of the casing 11 through the plural inlet apertures 13. The second chamber 11e is in communication with the exterior of the casing 11 through the plural vent apertures 14. The communication channel 11d is connected between the first chamber 11c and the second chamber 11e to make the first chamber 11c and the second chamber 11e in fluid communication. Since the inlet apertures 13, the first chamber 11c, the communication channel 11d, the second chamber 11e and the vent apertures 14 are sequentially in communication with each other, a gas circulation loop is defined, which is beneficial to gas transportation and gas circulation. That is, the gas is transferred and circulated along the gas circulation loop. In some other embodiments, the casing 11 includes plural communication channels 11d. It is noted that the number of the communication channels 11d is not restricted.

Please refer to FIG. 2B again. The portable electronic device 1 further includes an actuating and sensing module 10. The actuating and sensing module 10 includes an actuating device 12 and a sensor 15. The actuating device 12 may be disposed within the first chamber 11c as well as closing the plural inlet apertures 13. The installation method of the actuating device 12 may be varied according to the practical requirements. The actuating device 12 is used for guiding the ambient gas into the first chamber 11c. In addition, the actuating device 12 further includes a first protective film 120. The first protective film 120 is a waterproof and dustproof film structure allowing gas to pass therethrough but preventing liquid from entering. The sensor 15 may be disposed within the second chamber 11e. The sensor 15 is for detecting the concentrations and contents of certain substances in the air, such as harmful gas, particles or other pollutants. When the actuating device 12 of the actuating and sensing module 10 is enabled, the gas is introduced into the first chamber 11e through the inlet apertures 13. Due to the pressure gradient change of the gas, the gas is transferred from the first chamber 11c to the second chamber 11e through the communication channel 11d. The gas introduced into the second chamber 11e is monitored by the sensor 15. After the gas is monitored, the gas is discharged via the vent apertures 14 to the exterior of the casing 11. Consequently, the information relating to environmental gas monitoring result is acquired. Due to the arrangement of the first protective film 120, moisture and dust are avoided from entering the first chamber 11c and the second chamber 11e such that the actuating device 12 in the first chamber 11c and the sensor 15 in the second chamber 11e are prevented from being rusted or damaged. As the actuating device 12 of the actuating and sensing module 10 is continuously enabled, the gas is continuously guided into the first chamber 11c and continuously transferred to the second chamber 11e to be sensed by the sensor 15. Since the concentrations and contents of the substances in the air are continuously monitored, the information relating to environmental gas monitoring result can be acquired in real time.

In this embodiment, the actuating device 12 is an air pump with a resonance-type piezoelectric actuator, but not limited thereto. The actuating device 12 may be a motor or a pump having one selected from the group consisting of an electric actuating device, a magnetic actuating device, a thermal actuating device, a piezoelectric actuating device, and a fluid actuating device. For example, the actuating device 12 can be but not limited to a DC/AC/step motor with the electric actuating device, a magnetic coil motor with the magnetic actuating device, a heat pump with the thermal actuating device, or an air/liquid pump with the fluid actuating device.

In some embodiments, the sensor 15 includes but not limited to at least one selected from the group consisting an oxygen sensor, a carbon monoxide sensor, a carbon dioxide sensor, a temperature sensor, an ozone sensor, a particulate sensor (e.g., a PM2.5 particle sensor), a sulfur dioxide sensor, a nitrogen dioxide sensor, a volatile organic compound sensor (e.g., a sensor for measuring formaldehyde or ammonia gas), and a combination thereof.

Please refer to FIG. 2B again. The portable electronic device 1 further includes at least one second protective film 18. The second protective film 18 is disposed on the vent apertures 14 to close the vent apertures 14. The second protective film 18 is a waterproof and dustproof film structure allowing gas to pass therethrough but preventing liquid from entering. The second protective film 18 prevents moisture and dust from entering the second chamber 11e through the vent apertures 14, such that the sensor 15 within the second chamber 11e is avoided being rusted or damaged. In this embodiment, the first protective film 120 and the second protective film 18 comply with the Rating IP64 of International Protection Marking (IEC 60529), i.e., Dust protection level 6 (Complete protection, No ingress of dust) and Water protection level 4 (Protection against Splashing of water: Water splashing against the enclosure from any direction shall have no harmful effect). In another embodiment, the first protective film 120 and the second protective film 18 comply with the Rating IP68 of International Protection Marking (IEC 60529), i.e., Dust protection level 6 and Water protection level 8 (Continuous immersion in water produces no harmful effects).

Figure 2C:
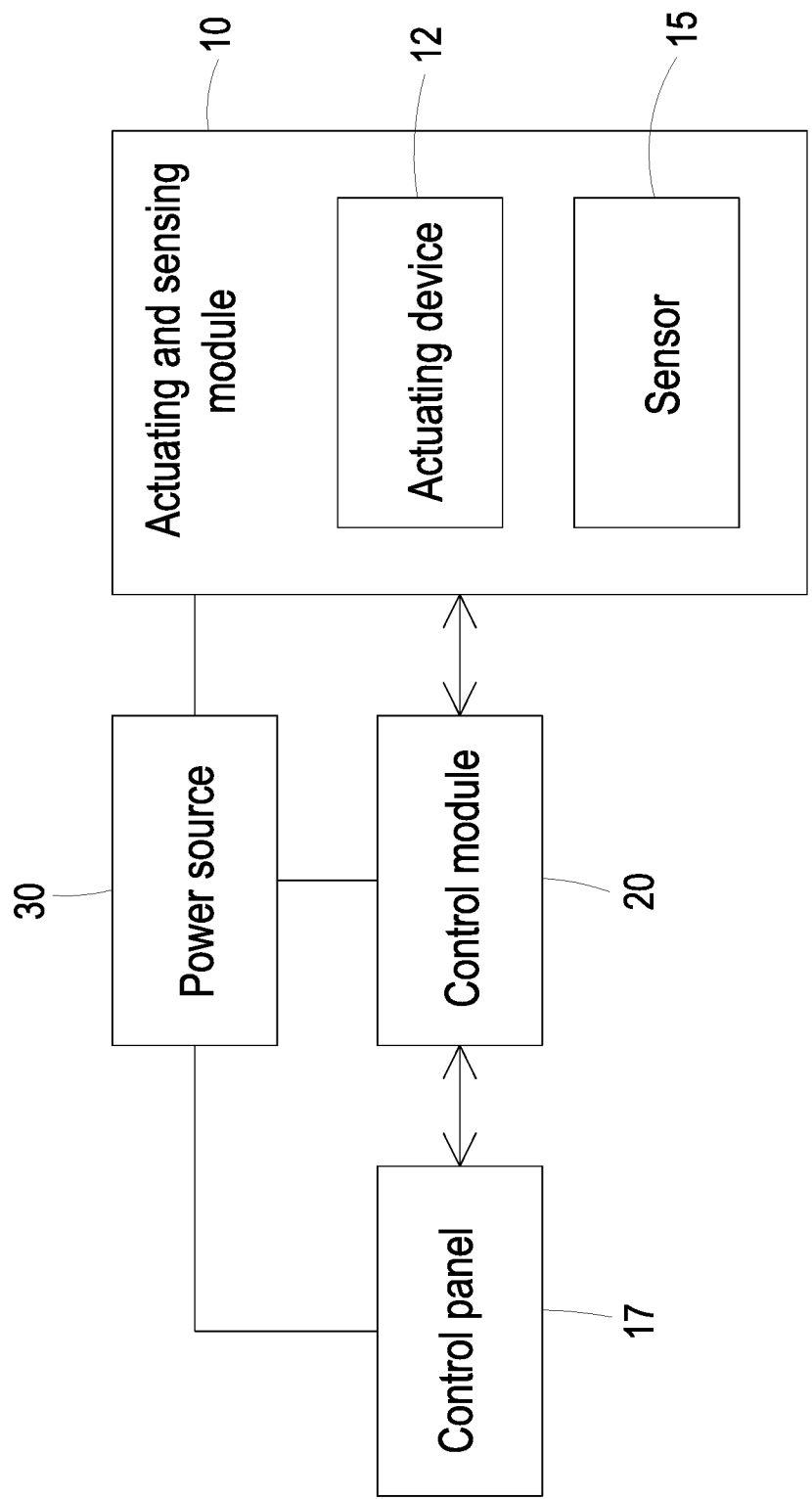
FIG. 2C is a schematic functional block diagram illustrating the architecture of the portable electronic device according to the embodiment of the present disclosure.

Please refer to FIG. 2C. FIG. 2C is a schematic functional block diagram illustrating the architecture of the portable electronic device according to the embodiment of the present disclosure. The portable electronic device 1 further includes a control module 20 and a power source 30. The control module 20 is disposed within the accommodation space 19 (not shown). The control module 20 is electrically connected with the control panel 17 and the actuating and sensing module 10 for receiving and transmitting signals, by which a user operation interface shown by the control panel 17, and the enabled/disabled state of the actuating and sensing module 10, are controlled by the control module 20. The power source 30 is disposed within the accommodation space 19 (not shown). The power source 30 is electrically connected with the control panel 17, the control module 20 and the actuating and sensing module 10 to provide driving power thereto. The control panel 17 is operable to issue an enabling signal to the control module 20. In response to the enabling signal, the control module 20 enables the actuating and sensing module 10 to transfer and detect the gas and transmit the detection result back to the control module 20. The control module 20 makes the detection result displayed on the control panel 17, so that the user realizes the information relating to the ambient gas. In addition, the control panel 17 is operable to issue a disabling signal to the control module 20. In response to the disabling signal, the actuating and sensing module 10 is disabled by the control module 20. By disabling the actuating and sensing module 10 when it is not needed to be used, electric energy is not wasted and the use life of the actuating and sensing module 10 is prolonged since the possibility of causing the damage of the components is minimized.

In this embodiment, if the actuating and sensing module 10 detects that the concentration or content of pollutants (e.g., carbon monoxide, carbon dioxide, volatile toxic gases, sulfur dioxide or nitrogen dioxide) in the ambient air exceeds a threshold value, the actuating and sensing module 10 issues a warning signal to the control module 20. According to the warning signal, the control module prompts the user that the concentration or content of the harmful gas in the environment is too high. After realizing the harmful level of the ambient gas, the user is given a chance to escape quickly or take protective measures, instantly. Consequently, the possibility that the user might faint, be poisoned or encounter gas explosion, will be largely reduced.

In an embodiment, the power source 30 is a built-in battery of the portable electronic device 1. That is, the battery (not shown) installed in the portable electronic device 1 is directly used as the power source of the portable electronic device 1, and the driving power is transmitted to the control panel 17, the control module 20 and the actuating and sensing module 10. In another embodiment, the power source 30 is another battery independent from the built-in battery of the portable electronic device 1. The type of the power source 30 is not restricted and can varied according to practical requirements.

Figure 3A:
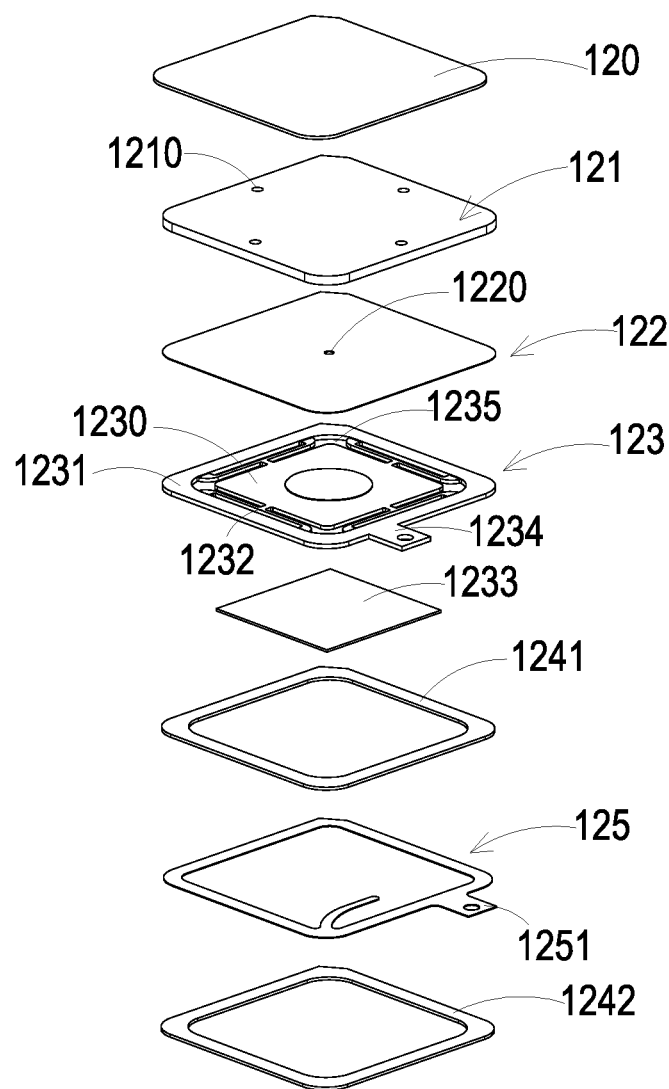
FIG. 3A is a schematic exploded view illustrating the actuating device of the portable electronic device according to the embodiment of the present disclosure and taken along a front side.
Figure 3B:
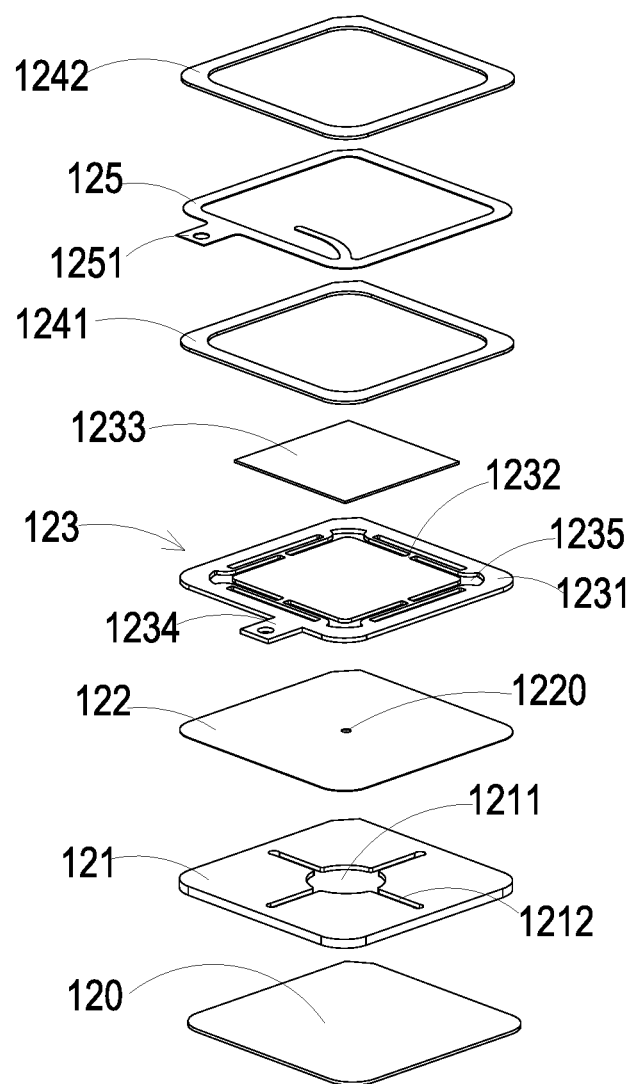
FIG. 3B is a schematic exploded view illustrating the actuating device of FIG. 3A and taken along a rear side.

Please refer to FIGS. 3A and 3B. FIG. 3A is a schematic exploded view illustrating the actuating device of the portable electronic device according to the embodiment of the present disclosure and taken along a front side. FIG. 3B is a schematic exploded view illustrating the actuating device of FIG. 3A and taken along a rear side. The actuating device 12 includes the first protective film 120, a gas inlet plate 121, a resonance plate 122, a piezoelectric actuator 123, a first insulation plate 1241, a conducting plate 125 and a second insulation plate 1242, which are stacked on each other sequentially. The first protective film 120 is attached on an outer surface of the gas inlet plate 121. The piezoelectric actuator 123 includes a suspension plate 1230 and a piezoelectric plate 1233. The piezoelectric plate 1233 may be a piezoelectric ceramic plate. Moreover, the piezoelectric actuator 123 is disposed corresponding to the resonance plate 122. When the piezoelectric actuator 123 is enabled, the gas is fed into at least one gas inlet hole 1210 of the gas inlet plate 121 and transferred to plural pressure chambers (not shown). Consequently, the gas is transferred downwardly.

Please keep referring to FIGS. 3A and 3B. As shown in FIG. 3A, the gas inlet plate 121 of the actuating device 12 includes the at least one gas inlet hole 1210. In this embodiment, the gas inlet plate 121 comprises four gas inlet holes 1210. It is noted that the number of the at least one gas inlet holes 1210 is not restricted. In response to the action of the atmospheric pressure, the gas can be introduced into the actuating device 12 through the at least one gas inlet hole 1210.

As shown in FIG. 3B, a central cavity 1211 and at least one convergence channel 1212 are formed in a bottom surface of the gas inlet plate 121. The at least one convergence channel 1212 is disposed corresponding to the at least one gas inlet hole 1210. In an embodiment, the gas inlet plate 121 has four convergence channels 1212 and four gas inlet holes 1210 which are correspondingly arranged. After the gas is introduced into the at least one convergence channel 1212 through the at least one inlet 1211, the gas is guided to the central cavity 1211 and transferred downwardly. In this embodiment, the at least one gas inlet hole 1210, the at least one convergence channel 1212 and the central cavity 1211 of the gas inlet plate 121 are integrally formed from a single structure. The central cavity 1211 is a convergence chamber for temporarily storing the gas. In some embodiments, the gas inlet plate 121 may be for example, made of stainless steel. In other embodiments, the depth of the convergence chamber defined by the central cavity 1211 may be equal to the depth of the at least one convergence channel 1212.

Please keep referring to FIGS. 3A and 3B. The first protective film 120 is attached on the top surface of the gas inlet plate 121, and the four gas inlet holes 1210 of the gas inlet plate 121 are covered and sealed by the first protective film 120. The first protective film 120 is a waterproof and dustproof film structure allowing gas to pass therethrough but preventing liquid from entering. When the actuating device 12 is enabled, the gas is filtered by the first protective film 120 and the moisture and dust contained in the gas are removed by the first protective film 120. Consequently, the gas without moisture and dust is introduced into the gas inlet hole 1210. Since no moisture and dust are introduced into the actuating device 12, the components within the actuating device 12 are prevented from being damaged or rusted. Moreover, the gas transportation efficiency is enhanced. On the other hand, due to the arrangement of the first protective film 120, the gas discharged from the actuating device 12 does not contain moisture and dust. Consequently, the components contacted with the discharged gas are prevented from being rusted or damaged by the gas. In some embodiments, the actuating device 12 includes plural first protective films 120. Each first protective film 120 has the size matching the size of a single gas inlet hole 1210, and is respectively disposed on the corresponding gas inlet hole 1210 in order to close the gas inlet hole 1210 and filter the moisture and dust.

In this embodiment, the resonance plate 122 is made of flexible material. The resonance plate 122 has a central aperture 1220 disposed corresponding to the central cavity 1211 of the bottom surface of the gas inlet plate 121 which allows the gas to be transferred therethrough. In other embodiments, the resonance plate 122 may be, for example, made of copper.

Figure 4A:
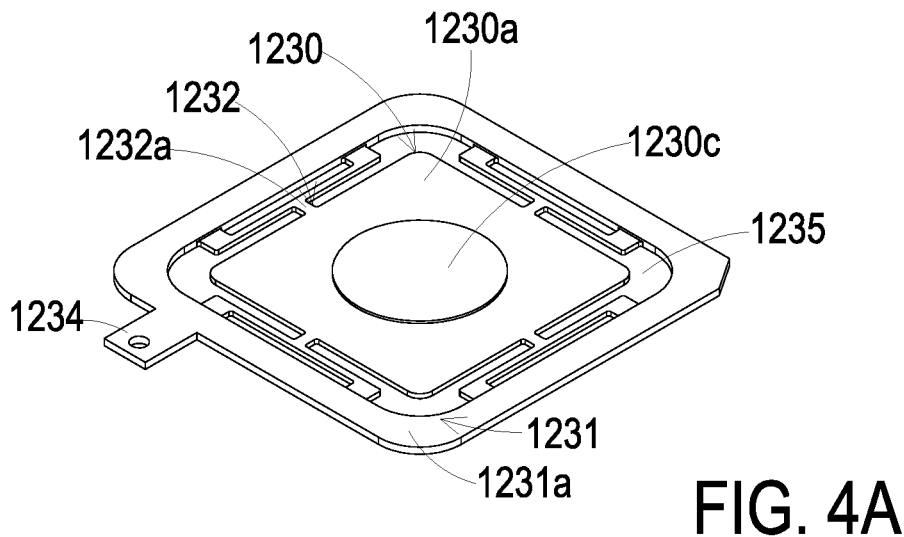
FIG. 4A is a schematic perspective view illustrating the piezoelectric actuator of the actuating device of FIG. 3A and taken along the front side.
Figure 4B:
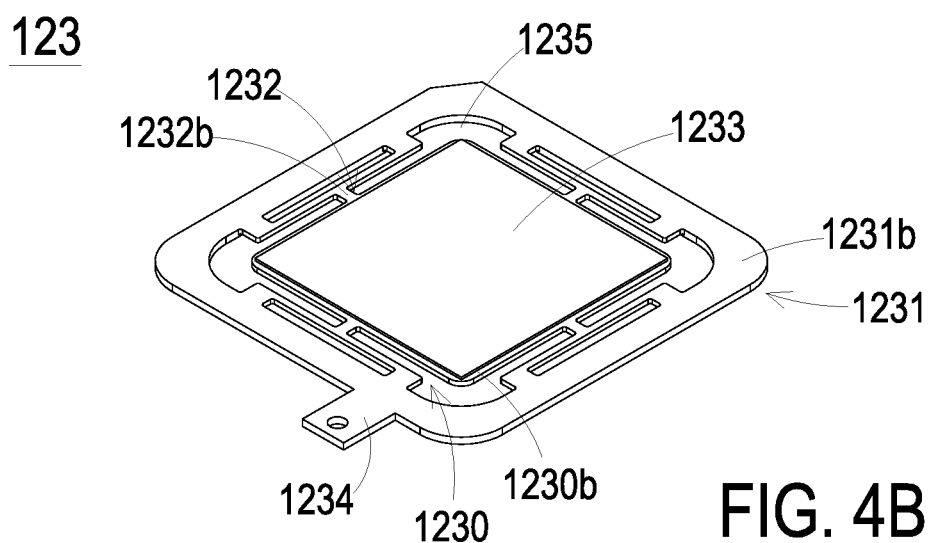
FIG. 4B is a schematic perspective view illustrating the piezoelectric actuator of the actuating device of FIG. 3A and taken along the rear side.
Figure 4C:
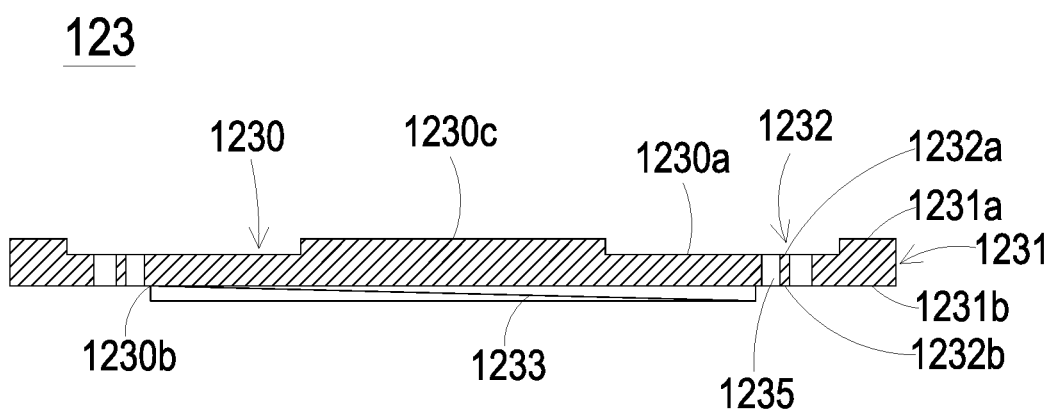
FIG. 4C is a schematic cross-sectional view illustrating the piezoelectric actuator of the actuating device of FIG. 3A.

Please refer to FIGS. 4A to 4C. FIG. 4A is a schematic perspective view illustrating the piezoelectric actuator of the actuating device of FIG. 3A and taken along the front side. FIG. 4B is a schematic perspective view illustrating the piezoelectric actuator of the actuating device of FIG. 3A and taken along the rear side. FIG. 4C is a schematic cross-sectional view illustrating the piezoelectric actuator of the actuating device of FIG. 3A. In this embodiment, the piezoelectric actuator 123 includes a suspension plate 1230, an outer frame 1231, plural brackets 1232 and a piezoelectric plate 1233. The piezoelectric plate 1233 is attached on a bottom surface 1230b of the suspension plate 1230. The plural brackets 1232 are connected between the suspension plate 1230 and the outer frame 1231, while the two ends of the brackets 1232 are connected with the outer frame 1231 and the suspension plate 1230 respectively that the brackets 1232 can elastically support the suspension plate 1230. At least one vacant space 1235 is formed between the bracket 1232, the suspension plate 1230 and the outer frame 1231 for allowing the gas to go through. The type of the suspension plate 1230 and the outer frame 1231 and the type and the number of the at least one bracket 1232 may be varied according to the practical requirements. Moreover, a conducting pin 1234 is protruded outwardly from the outer frame 1231 so as to be electrically connected to an external circuit (not shown).

In this embodiment, the suspension plate 1230 has a bulge 1230c that makes the suspension plate 1230 a stepped structure. The bulge 1230c is formed on a top surface of 1230a of the suspension plate 1230. The bulge 1230c may be a circular convex structure. Please refer to FIGS. 4A, 4B and 4C. A top surface of the bulge 1230c of the suspension plate 1230 is coplanar with a top surface 1231a of the outer frame 1231, and the top surface 1230a of the suspension plate 1230 is coplanar with a top surface 1232a of the bracket 1232. Moreover, there is a specific depth from the bulge 1230c of the suspension plate 1230 (or the top surface 1231a of the outer frame 1231) to the top surface 1230a of the suspension plate 1230 (or the top surface 1232a of the bracket 1232). Please refer to FIGS. 4B and 4C. A bottom surface 1230b of the suspension plate 1230, the bottom surface 1231b of the outer frame 1231 and a bottom surface 1232b of the bracket 1232 are coplanar with each other. The piezoelectric plate 1233 is attached on the bottom surface 1230b of the suspension plate 1230. In some embodiments, the suspension plate 1230, the brackets 1232 and the outer frame 1231 may be integrally formed from a metal plate (e.g., a stainless steel plate).

Please refer to FIGS. 3A and 3B again. In this embodiment, the first insulation plate 1241, the conducting plate 125 and the second insulation plate 1242 of the actuating device 12 are stacked on each other sequentially and located under the piezoelectric actuator 123. The profiles of the first insulation plate 1241, the conducting plate 125 and the second insulation plate 1242 substantially match the profile of the outer frame 1231 of the piezoelectric actuator 123. In some embodiments, the first insulation plate 1241 and the second insulation plate 1242 may be made of an insulating material (e.g. a plastic material) for providing insulating efficacy. In other embodiments, the conducting plate 125 may be made of an electrically conductive material (e.g. a metallic material) for providing electrically conducting efficacy. In this embodiment, the conducting plate 125 may have a conducting pin 1251 disposed thereon so as to be electrically connected with an external circuit (not shown).

Figure 5A:
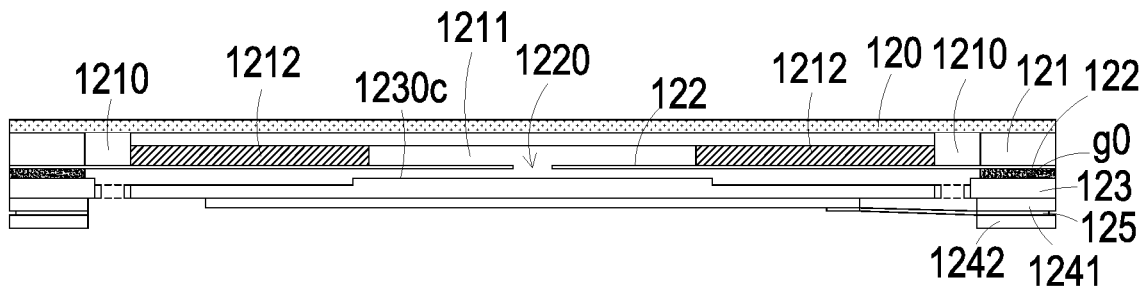

Please refer to FIGS. 3A and 3B and FIGS. 5A to 5E. FIGS. 5A to 5E schematically illustrate the actions of the air pump of FIG. 3A. As shown in FIG. 5A, the first protective film 120, the gas inlet plate 121, the resonance plate 122, the piezoelectric actuator 123, the first insulation plate 1241, the conducting plate 125 and the second insulation plate 1242 are stacked on each other sequentially. Moreover, there is a gap g0 between the resonance plate 122 and the piezoelectric actuator 123. In this embodiment, the gap g0 between the resonance plate 122 and the outer frame 1231 of the piezoelectric actuator 123 may be filled with a filler (e.g. a conductive adhesive) so that a depth from the resonance plate 122 to the bulge 1230c of the suspension plate 1230 of the piezoelectric actuator 123 can be maintained. The gap g0 ensures the proper distance between the resonance plate 122 and the bulge 1230c of the suspension plate 1230 of the piezoelectric actuator 123, so that the gas can be transferred quickly, the contact interference is reduced and the generated noise is largely reduced. In some embodiments, alternatively, the height of the outer frame 1231 of the piezoelectric actuator 123 is increased, so that the gap is formed between the resonance plate 122 and the piezoelectric actuator 123.

Please refer to FIGS. 5A to 5E again. After the first protective film 120, the gas inlet plate 121, the resonance plate 122 and the piezoelectric actuator 123 are combined together, the at least one gas inlet hole 1210 of the gas inlet plate 121 is covered and closed by the first protective film 120. In addition, a convergence chamber for converging the gas is defined by the central aperture 1220 of the resonance plate 122 and the central cavity 1211 of the gas inlet plate 121 collaboratively, and a third chamber 1221 is formed between the resonance plate 122 and the piezoelectric actuator 123 for temporarily storing the gas. Through the central aperture 1220 of the resonance plate 122, the third chamber 1221 is in communication with the central cavity 1211 of the gas inlet plate 121. The peripheral regions of the third chamber 1221 are in communication with the accommodation space 11c of the casing 11 (see FIG. 2B) through the vacant space 1235 between the brackets 1232 of the piezoelectric actuator 123.

Figure 5B:
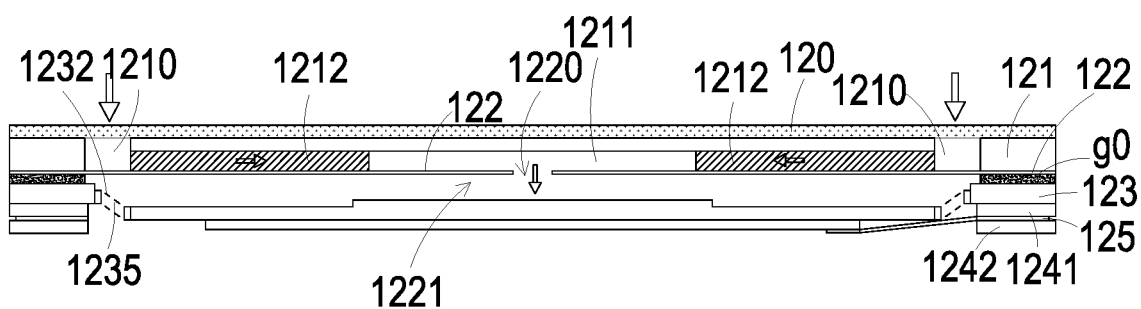
Figure 5C:
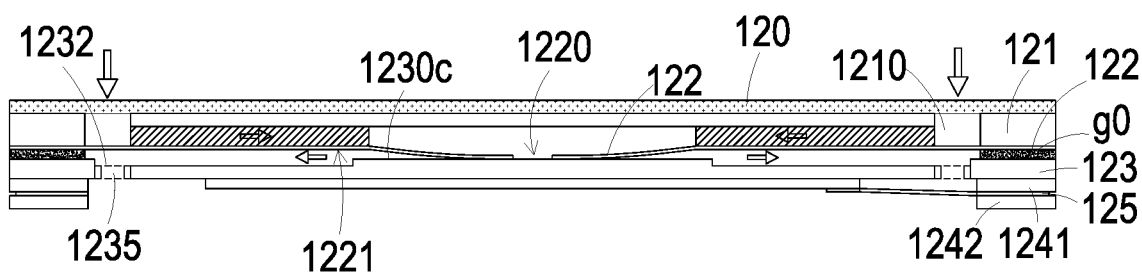

In this embodiment, when the actuating device 12 is enabled, the piezoelectric actuator 123 vibrates along a vertical direction in a reciprocating manner by using the bracket 1232 as a fulcrum. As shown in FIG. 5B, the piezoelectric actuator 123 vibrates downwardly in response to the applied voltage. Meanwhile, the gas is fed into the at least one gas inlet hole 1210 of the convergence plate 12 by passing through the first protective film 120, in which the moisture and dust contained in the gas is removed and filtered out by the first protective film 120. Then, the gas is converged to the central cavity 1211 of the gas inlet plate 121 through the at least one convergence channel 1212, and transferred downwardly to the third chamber 1221 through the central aperture 1220 of the resonance plate 122. As the piezoelectric actuator 123 is enabled, the resonance of the resonance plate 122 occurs. Consequently, the resonance plate 122 vibrates along the vertical direction in the reciprocating manner. As shown in FIG. 5C, the resonance plate 122 vibrates downwardly, so as to contact and attach on the bulge 1230c of the suspension plate 1230 of the piezoelectric actuator 123. Owing to the deformation of the resonance plate 122 described above, a middle communication space of the third chamber 1221 is closed, and the volume of the third chamber 1221 is compressed. Under this circumstance, the pressure gradient occurs to push the gas in the third chamber 1221 toward peripheral regions of the third chamber 1221, and flowing downwardly through the vacant space 1235 of the piezoelectric actuator 123. As shown in FIG. 5D, the resonance plate 122 returns to its original position when the piezoelectric actuator 123 deforms upwardly during the vibration. Consequently, the volume of the third chamber 1221 is continuously compressed. Since the piezoelectric actuator 123 is ascended for a displacement d, the gas is continuously pushed toward peripheral regions of the third chamber 1221. Meanwhile, the gas is continuously fed into the at least one gas inlet hole 1210 of the gas inlet plate 121 through the first protective film 120 and transferred to the central cavity 1211. Then, as shown in FIG. 5E, the resonance plate 122 moves upwardly, which is cause by the resonance of upward motion of the piezoelectric actuator 123. Under this circumstance, the gas in the central cavity 1211 is transferred to the third chamber 1221 through the central aperture 1220 of the resonance plate 122, then the gas is transferred downwardly through the vacant space 1235 of the piezoelectric actuator 123, and finally the gas is exited from the actuating device 12. Consequently, a pressure gradient is generated in the fluid channels of the actuating device 12 to facilitate the gas to flow at a high speed. Moreover, since there is an impedance difference between the feeding direction and the discharging direction, the gas can be transmitted from the inlet side to the outlet side. Even if a gas pressure exists at the outlet side, the actuating device 12 still has the capability of pushing the gas to the outlet side while achieving the silent efficacy. In some embodiments, the vibration frequency of the resonance plate 122 along the vertical direction in the reciprocating manner is identical to the vibration frequency of the piezoelectric actuator 123. That is, the resonance plate 122 and the piezoelectric actuator 123 are synchronously vibrated along the upward direction or the downward direction. It is noted that numerous modifications and alterations of the actions of the actuating device 12 may be made while retaining the teachings of the invention.

From the above descriptions, the present disclosure provides the portable electronic device with an actuating and sensing module. After the gas is transferred through the first protective film, the moisture and dust contained in the gas are removed by the first protective film. The filtered gas is fed into the gas pump through the at least one gas inlet hole. When the piezoelectric actuator is activated, a pressure gradient is generated in the fluid channels and the chambers of the actuating device to facilitate the gas to flow at a high speed. The gas is transferred to the first chamber and the second chamber of the casing and discharged from the casing through the vent aperture. Consequently, the gas circulates and is quickly transferred while achieving silent efficacy. Due to the arrangement of the first protective film and the second protective film, the gas discharged from the actuating device is dry and clean, which makes the first chamber and the second chamber of the casing also dry and clean. As so, the actuating and sensing module and the components within the first chamber and the second chamber are prevented from being rusted or damaged resulted from moisture and dust in the gas, and the performance of transferring and sensing the gas is consequently enhanced. Moreover, since the overall volume and thickness of the actuating device are reduced, the actuating device is suitably applied to the miniature device or the portable electronic device which is easily carried by the user. As a result, information relating to the ambient air of the user which is generated from real-time environmental gas monitoring is provided to the user everywhere and anytime. Also, the portable electronic device prompts the user once the concentration or content of pollutants in the ambient air has exceeded the threshold value, and notifies the user about the damage level of the pollutants, such that the user can escape quickly or take protective measures. Consequently, the possibility that the user might faint, be poisoned or encounter gas explosion will be largely reduced.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A portable electronic device with an actuating and sensing module, the portable electronic device comprising:
a casing comprising at least one inlet aperture, at least one vent aperture, a first chamber in communication with the exterior of the casing through the at least one inlet aperture, a second chamber in communication with the exterior of the casing through the at least one vent aperture, and at least one communication channel in fluid communication between the first chamber and the second chamber; and an actuating and sensing module comprising:
an actuating device disposed within the first chamber and closing the at least one inlet aperture, the actuating device comprising a first protective film that is a waterproof and dustproof film structure allowing gas to pass therethrough; and
a sensor disposed within the second chamber;

wherein when the actuating device of the actuating and sensing module is enabled, the gas is guided into the first chamber through the at least one inlet aperture and flows to the second chamber through the at least one communication channel to be monitored by the sensor, after which the gas is discharged through the at least one vent aperture.

2. The portable electronic device according to claim 1, wherein the portable electronic device further comprises a second protective film disposed on the at least one vent aperture and closing the at least one vent aperture, wherein the second protective film is a waterproof and dustproof film structure allowing gas to pass therethrough.

3. The portable electronic device according to claim 2, wherein the first protective film and the second protective film comply with Rating IP64 of International Protection Marking (IEC 60529).

4. The portable electronic device according to claim 2, wherein the first protective film and the second protective film comply with Rating IP68 of International Protection Marking (IEC 60529).

5. The portable electronic device according to claim 1, wherein the sensor comprises at least one selected from the group consisting of an oxygen sensor, a carbon monoxide sensor, a carbon dioxide sensor, a temperature sensor, an ozone sensor, a sulfur dioxide sensor, a nitrogen dioxide sensor, a volatile organic compound sensor and a combination thereof.

6. The portable electronic device according to claim 1, wherein the actuating device is a DC motor, an AC motor or a step motor, wherein the actuating device has an electric actuating device.

7. The portable electronic device according to claim 1, wherein the actuating device is a magnetic coil motor with a magnetic actuating device.

8. The portable electronic device according to claim 1, wherein the actuating device is a heat pump having a thermal actuating device.

9. The portable electronic device according to claim 1, wherein the actuating device is an air pump or a liquid pump, wherein the actuating device has a fluid actuating device.

10. The portable electronic device according to claim 1, wherein the actuating device is a resonance-type piezoelectric air pump which comprises:
a gas inlet plate comprising at least one gas inlet hole;
a resonance plate; and
a piezoelectric actuator,
wherein the first protective film, the gas inlet plate, the resonance plate and the piezoelectric actuator are stacked on each other sequentially to be positioned, and a gap is formed between the resonance plate and the piezoelectric actuator to define a third chamber, wherein when the piezoelectric actuator is enabled, the gas is fed into the at least one gas inlet hole of the gas inlet plate and transferred to the third chamber through the resonance plate, so that the gas is introduced into the at least one inlet aperture.

11. The portable electronic device according to claim 10, wherein the gas inlet plate further comprises at least one convergence channel and a central cavity, wherein the at least one convergence channel is disposed corresponding to the at least one gas inlet hole for guiding the gas fed into the at least one gas inlet hole to the central cavity, wherein the resonance plate has a central aperture spatially corresponding to the central cavity of the gas inlet plate, wherein the piezoelectric actuator comprises a suspension plate and an outer frame connected with each other by at least one bracket, and the suspension plate has a surface attached with a piezoelectric ceramic plate.

12. The portable electronic device according to claim 10, wherein the actuating device further comprises at least one insulation plate and a conducting plate, wherein the at least one insulation plate and the conducting plate are sequentially disposed under the piezoelectric actuator.

13. The portable electronic device according to claim 1, wherein the portable electronic device further comprises a control module and a control panel, and the control module is electrically connected with the control panel and the actuating and sensing module, wherein when the control panel is operated to issue an enabling signal to the control module, the actuating and sensing module is enabled by the control module according to the enabling signal to transfer and sense the gas, wherein after the gas is sensed by the actuating and sensing module, a detecting result is transmitted from the actuating and sensing module to the control module, and the detecting result is displayed on the control panel by the control module.

14. The portable electronic device according to claim 13, wherein when the control panel is operated to issue a disabling signal to the control module, the actuating and sensing module is disabled by the control module according to the disabling signal.

15. The portable electronic device according to claim 13, wherein the portable electronic device further comprises a power source electrically connected with the control panel, the control module and the actuating and sensing module.

16. The portable electronic device according to claim 15, wherein the power source is a battery installed in the portable electronic device.

17. A portable electronic device with an actuating and sensing module, the portable electronic device comprising:
at least one casing comprising at least one inlet aperture, at least one vent aperture, at least one first chamber in communication with the exterior of the casing through the inlet aperture, at least one second chamber in communication with the exterior of the casing through the vent aperture, and at least one communication channel in fluid communication between the first chamber and the second chamber; and
at least one actuating and sensing module comprising:
at least one actuating device disposed within the first chamber and closing the inlet aperture, the actuating device comprising at least one first protective film that is a waterproof and dustproof film structure allowing gas to pass therethrough; and
at least one sensor disposed within the second chamber;
wherein when the actuating device of the actuating and sensing module is enabled, the gas is guided into the first chamber through the inlet aperture and flows to the second chamber through the communication channel to be monitored by the sensor, after which the gas is discharged through the vent aperture.

* * * * *